US012731040B2

(12) United States Patent
Stepanova et al.

(10) Patent No.: US 12,731,040 B2
(45) Date of Patent: Sep. 8, 2026

(54) DEVICE, A COMPUTER PROGRAM AND A COMPUTER-IMPLEMENTED METHOD FOR DETERMINING NEGATIVE SAMPLES FOR TRAINING A KNOWLEDGE GRAPH EMBEDDING OF A KNOWLEDGE GRAPH

(71) Applicant: Robert Bosch GmbH, Stuttgart (DE)

(72) Inventors: Daria Stepanova, Leonberg (DE); Mohamed Gad-Elrab, Saarbruecken (DE); Nitisha Jain, Potsdam (DE); Trung Kien Tran, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 997 days.

(21) Appl. No.: 17/854,527

(22) Filed: Jun. 30, 2022

(65) Prior Publication Data

US 2023/0025314 A1 Jan. 26, 2023

(30) Foreign Application Priority Data

Jul. 6, 2021 (EP) .................................... 21184012

(51) Int. Cl.
*G06N 5/02* (2023.01)
*G06F 18/20* (2023.01)

(52) U.S. Cl.
CPC ............... *G06N 5/02* (2013.01); *G06F 18/29* (2023.01)

(58) Field of Classification Search
CPC .................................. G06N 5/02; G06F 18/29
See application file for complete search history.

(56) References Cited

U.S. PATENT DOCUMENTS

2020/0065668 A1 2/2020 Garcia et al.
2022/0237185 A1* 7/2022 Portisch .............. G06F 16/2465

FOREIGN PATENT DOCUMENTS

JP 2018085116 A 5/2018
JP 2021034054 A 3/2021

OTHER PUBLICATIONS

Zhang, Yongqi, et al. "NSCaching: simple and efficient negative sampling for knowledge graph embedding." 2019 IEEE 35th International Conference on Data Engineering (ICDE). IEEE, 2019. (Year: 2019).*

(Continued)

*Primary Examiner* — Kevin W Figueroa
(74) *Attorney, Agent, or Firm* — NORTON ROSE FULBRIGHT US LLP

(57) ABSTRACT

A method for determining negative samples for training a knowledge graph embedding of a knowledge graph enhanced by an ontology including at least one constraint for distinguishing a fact of the knowledge graph from a spurious fact. The method comprises determining embedding predicted triples; determining a set of triples that comprises a triple of the knowledge graph and at least one of the predicted triples that are inconsistent with respect to the ontology; determining from the set of triples a replacement entity for the object entity in the at least one triple of the predicted triples; and determining the negative sample to comprise the relation, the subject entity and the replacement entity, or determining from the subset a replacement entity for the subject entity in the at least one triple of the predicted triples and determining the negative sample to comprise the relation, the object entity, and the replacement entity.

6 Claims, 2 Drawing Sheets

(56) References Cited

OTHER PUBLICATIONS

Wang, Quan, et al. "Knowledge graph embedding: A survey of approaches and applications." IEEE transactions on knowledge and data engineering 29.12 (2017): 2724-2743. (Year: 2017).*

D'Amato, Claudia, Nicola Flavio Quatraro, and Nicola Fanizzi. "Injecting background knowledge into embedding models for predictive tasks on knowledge graphs." European Semantic Web Conference. Cham: Springer International Publishing, 2021. (Year: 2021).*

Bordes et al., "Translating Embedding for Modeling Multi-Relational Data," Advances in Neural Information Processing Systems 26 (NIPS 2013), Neurips, 2013, pp. 1-9. extension://elhekieabhbkpmcefcoobjddigjcaadp/https://papers.nips.cc/paper/2013/file/1cecc7a77928ca8133fa24680a88d2f9-Paper.pdf Downloaded Jun. 29, 2022.

Trouillon et al., "Complex Embeddings for Simple Link Prediction," Proceedings of the 33rd International Conference on Machine Learning, PMLR, vol. 48, 2016, pp. 1-10. extension://elhekieabhbkpmcefcoobjddigjcaadp/http://proceedings.mlr.press/v48/trouillon16.pdf Downloaded Jun. 29, 2022.

Tran et al., "Fast Computation of Explanations for Inconsistency in Large-Scale Knowledge Graphs," International World Wide Web Conference Committee, 2020, pp. 2613-2619. extension://elhekieabhbkpmcefcoobjddigjcaadp/https://dl.acm.org/doi/pdf/10.1145/3366423.3380014 Downloaded Jun. 29, 2022.

Geng et al., "Ontozsl: Ontology-Enhanced Zero-Shot Learning," International World Wide Web Conference Committee, 2021, pp. 1-12.

Wang et al., "Efficient Knowledge Graph Validation via Cross-Graph Representation Learning," Proceedings of the 29th ACM International Conference on Information & Knowledge Management, 2020, pp. 1-11.

Bianchi et al., "Knowledge Graph Embeddings and Explainable AI," Cornell University, 2020, pp. 1-24.

Glimm et al., "Abstraction Refinement for Ontology Materialization," ISWC 2014, Part II, LNCS 8797, 2014, pp. 180-195. <https://sci-hub.se/10.1007/978-3-319-11915-1_12> Downloaded Jun. 29, 2022.

Owl 2 Web Ontology Language Document Overview (Second Edition), W3C Recommendation, 2012, pp. 1-8. https://www.w3.org/TR/owl2-overview/.

Baader et al., "Description Logics," Handbook on Ontologies, International Handbooks on Information Systems, 2009, pp. 21-43.

Glimm et al., "Ontology Materialization by Abstraction Refinement in Horn Shoif," Proceedings of the Thirty-First AAAI Conference on Artificial Intelligence (AAAI-17) , AAAI, 2017, pp. 1114-1120. <https://www.bing.com/search?q=Glimm%20-%20Ontology%20materialization%20by%20abstraction%20refinement%20in%20horn%20SHOIF%20%20%20%20%20%20%20%20%20%&qs=n&form=QBRE&=Search%20%7B0%7D%20for%20%7B1%7D&=Search%20work%20for%20%7B0%7D&=%25eManage%20Your%20Search%20History%25E&sp=-1&pq=trouillon%20-%20complex%20embedding%20for%20simple%20link%20prediction%20&sc=6-57&sk=&cvid=7265DED3B3E147E98E27244077D6D16C&ghsh=0&ghacc=0> Downloaded Jun. 29, 2022.

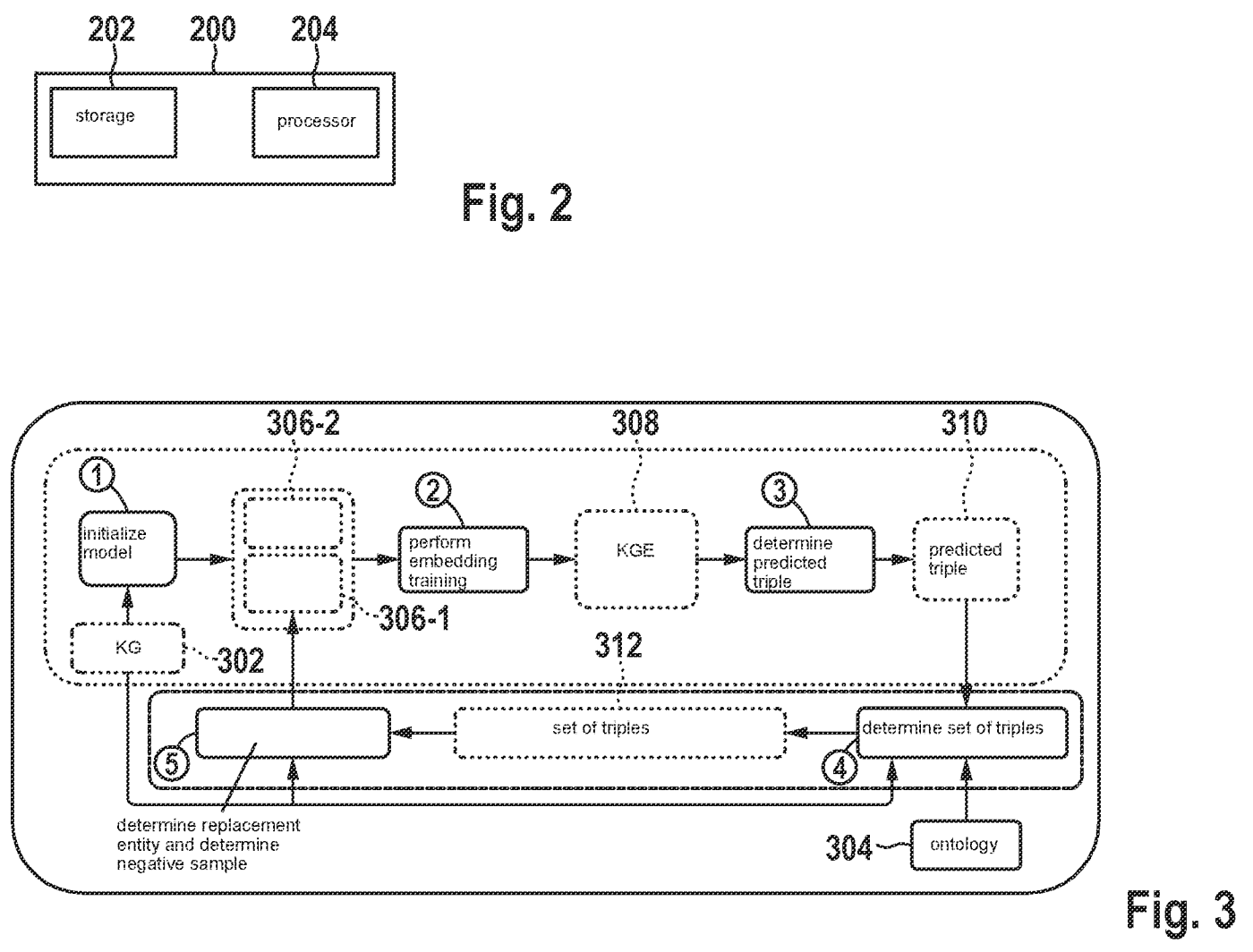

* cited by examiner 200
202 storage
204 processor

Fig. 2

302 KG
304 ontology
306-1
306-2
308 KGE
310 predicted triple
312 set of triples
1 initialize model
2 perform embedding training
3 determine predicted triple
4 determine set of triples
5 determine replacement entity and determine negative sample

Fig. 3

DEVICE, A COMPUTER PROGRAM AND A COMPUTER-IMPLEMENTED METHOD FOR DETERMINING NEGATIVE SAMPLES FOR TRAINING A KNOWLEDGE GRAPH EMBEDDING OF A KNOWLEDGE GRAPH

CROSS REFERENCE

The present application claims the benefit under 35 U.S.C. § 119 of European Patent Application No. EP 21 18 4012.9 filed on Jul. 6, 2021, which is expressly incorporated herein by reference in its entirety.

SUMMARY

The present invention relates to a computer-implemented method for determining negative samples for training a knowledge graph embedding of a knowledge graph, KG.

The KG may be trained with positive triples or negative triples. Since the KG stores explicitly only positive triples as facts of the KG, proper negative triple generation is acknowledged to be a very challenging problem.

It is desirable to provide a method that has a systematic way of providing negative samples that are actually incorrect facts.

In accordance with an example embodiment of the present invention, a computer-implemented method for determining negative samples for training a knowledge graph embedding of a knowledge graph, wherein the knowledge graph is enhanced by an ontology, wherein the ontology comprises at least one constraint for distinguishing a fact of the knowledge graph from a spurious fact, comprises determining with the knowledge graph embedding predicted triples, determining a set of triples that comprises at least one triple of the knowledge graph and at least one of the predicted triples that are inconsistent with respect to the ontology, wherein the at least one triple of the predicted triples comprises a subject entity, a relation, and an object entity from the knowledge graph, determining from the set of triples a replacement entity for the object entity in the at least one triple of the predicted triples, and determining the negative sample to comprise the relation, the subject entity and the replacement entity, or determining from the subset a replacement entity for the subject entity in the at least one triple of the predicted triples, and determining the negative sample to comprise the relation, the object entity, and the replacement entity. The set of triples that contains triples from the input knowledge graph and also the predicted triple made by the embedding represents an explanation for the inconsistency. With the explanation, further inconsistent triples are inferred that are semantically similar. The further inconsistent triples are determined via a generalization of the inconsistent triples that are inferred by the embedding model. The triples that this method yields are negative samples that are inconsistent with the knowledge graph and the accompanying ontology.

The method may comprise either determining the replacement entity for the object entity such that a triple resulting from replacing the object entity with the replacement entity is different than the at least one predicted triple and than the triples of the knowledge graph, or determining the replacement entity for the subject entity such that a triple resulting from replacing the subject entity with the replacement entity is different than the at least one predicted triple and than the triples of in the knowledge graph.

In accordance with an example embodiment of the present invention, determining the replacement entity for the subject entity may comprise determining a local type of the subject entity in the set of triples and selecting the replacement entity that has a local type within a predetermined order from the local type of the subject entity. This means, an entity in the knowledge graph neighborhood is found as a replacement for the subject entity.

Determining the replacement entity for the object entity may comprise determining a local type of the object entity in the set of triples and selecting the replacement entity that has a local type within a predetermined order from the local type of the object entity. This means, an entity in the knowledge graph neighborhood is found as a replacement for the object entity.

In accordance with an example embodiment of the present invention, preferably, the method comprises determining a plurality of replacement entities in the set of triples and determining a negative sample per replacement entity in the plurality of replacement entities.

To make the negative samples available for further training, the method comprises determining and/or storing training data comprising at least one negative sample.

In accordance with an example embodiment of the present invention, the method may comprise training the knowledge graph embedding in an iteration with at least one negative sample from a previous iteration.

In accordance with an example embodiment of the present invention, a device for determining a negative sample for training a knowledge graph embedding of a knowledge graph, wherein the knowledge graph is enhanced by an ontology, wherein the ontology comprises at least one constraint for distinguishing a fact of the knowledge graph from a spurious fact, comprises is configured to execute the method.

In accordance with an example embodiment of the present invention, a computer program comprises computer readable instructions that when executed by a computer cause the computer to perform a method.

Further advantageous embodiments of the present invention are derivable from the following description and the figures.

BRIEF DESCRIPTION OF THE DRAWINGS

FIG. 2 schematically depicts a device for determining a negative sample for training a knowledge graph embedding of the knowledge graph, in accordance with an example embodiment of the present invention.

FIG. 3 depicts a part of a method for determining a negative sample for training a knowledge graph embedding of the knowledge graph, in accordance with an example embodiment of the present invention.

DETAILED DESCRIPTION OF EXAMPLE EMBODIMENTS

Figure 1:
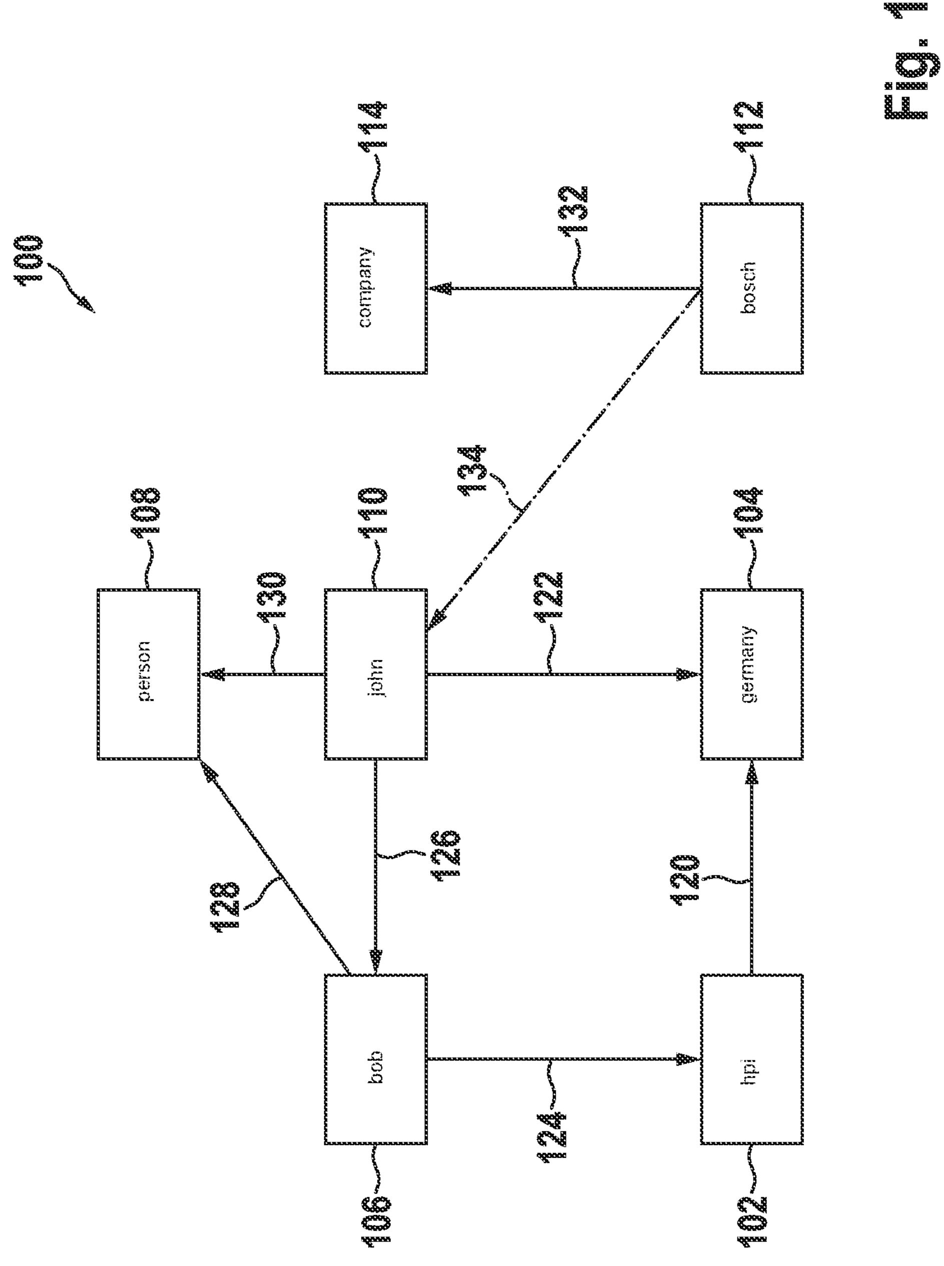
FIG. 1 depicts an exemplary knowledge graph.

A Knowledge Graph, KG, comprises a set of entities and a set of relations. The KG describes facts about a certain domain of interest by representing the facts with at least one entity of the set of entities that is interconnected via at least one relation of the set of relations to at least one other entity of the set of entities.

In a KG representation, an entity is represented by a node of the KG and a relation between two entities is represented by an edge of the KG between these nodes.

A fact is a triple of a subject, a predicate and an object. In the KG, the subject is an entity, the object is an entity and the predicate is a relation.

In a Knowledge Graph Embedding, KGE, of the KG, an entity is represented by an embedding. In the KGE, a relation is represented by an embedding. A triple of an embedding of the subject, an embedding of the predicate and an embedding of the object of a fact represents the fact in the KGE.

The KG may be used to predict a relation between a first given entity and a second given entity. The relation may be selected from the set of relations depending on a score. The score may be determined with a score function that maps an embedding of the first entity in the KGE, an embedding of the second entity in the KGE and an embedding of the relation in the KGE to the score.

The KG may be used to predict a first entity that has a given relation to a given second entity. The first entity may be selected from the set of entities depending on a score. The score may be determined with a score function that maps an embedding of the first entity in the KGE, an embedding of the given second entity in the KGE and an embedding of the given relation in the KGE to the score.

The embedding may be vectors in a vector space. Determining the score with the score function may comprise determining a vector sum or a vector multiplication. A different formula may be used to determine the score as well. Determining the vector sum may comprise adding a vector representing the relation to a vector representing the first entity. Determining the score may comprise determining a distance of the vector sum to a vector representing the second entity. The distance may be determined from the vector multiplication or different formula as well.

The embedding of the entities may be vectors in a first vector space. The embedding of the relations may be vectors in the first vector space or in a second vector space. Determining the score may comprise determining a mapping of a first vector representing the first entity in the first vector space to a first vector in the second vector space. Determining the score may comprise determining a mapping of a second vector representing the second entity in the first vector space to a second vector in the second vector space. Determining the score with the score function may comprise determining a vector sum. Determining the vector sum may comprise adding a vector representing the relation in the second vector space to the first vector. Determining the score may comprise determining a distance of the vector sum to the second vector.

In an example, the distance is a Euclidean distance.

For predicting the relation with the KG, an input that comprises two given entities may be mapped to an output that comprises the relation. The relation may be selected from the set of relations. In an example, the relation that is selected, results in a higher score than at least another relation of the set of relations. Preferably the relation is selected that results in the highest score of the relations in the set of relations.

For predicting an entity with the KG, an input that comprises a given entity and a given relation may be mapped to an output that comprises the entity. The entity may be selected from the set of entities. In an example, the entity that is selected, results in a higher score than at least another entity of the set of entities. Preferably the entity is selected that results in the highest score of the entities in the set of entities.

A neural network may be trained to represent the KGE. The neural network may be trained with training data that comprises triples of embedding. The training data may comprise triples that represent true facts of the KG. The training data may comprise triples that represent triples that are no true facts of the KG.

The neural network may be trained to map a first embedding of a given first entity and a second embedding of a given second entity of the set of entities to a score per relation of the set of relations. The score of a relation represents a probability for the relation that this relation is the relation between the given first entity and the given second entity.

The neural network may be trained to map an embedding of a given entity and an embedding of a given relation of the set of relations to a score per entity of the set of entities. The score of an entity represents a probability for the entity that this entity is the entity that has the given relation to the given entity.

KGs are widely used for natural question answering, web search, internet of things, and data analytics. KGs store information about millions of facts.

KGs may be constructed automatically, semi-automatically or at least partly manual, for example by using crowdsourcing methods.

In a training, the KG or the KGE, in particular the neural network, can be trained with training data to represent the knowledge that is available. The training data may comprise positive triples that represent true facts and negative triples that represent incorrect facts.

The KG or the KGE, in particular the neural network, may be trained with positive triples or negative triples.

The method described below provides a systematic way of providing negative triples that are incorrect facts.

The method discerns between correct, i.e. positive, and incorrect, i.e., negative triples.

The KG represents interlinked collections of factual information. The KG may be encoded as a set of (subject; predicate; object) triples, e.g., (john; worksAt; bosch). Subjects or objects of such triples are referred to as entities and predicates are referred to as relations. The set of triples of a KG can be represented as a directed graph, whose vertices and edges are labeled. KG triples are referred to as facts. KG facts may be represented as unary or binary ground predicates as follows: man(john), worksAt(john; bosch).

FIG. 1 schematically depicts a knowledge graph 100. The knowledge graph 100 comprises a plurality of entities and a plurality of relations. The following knowledge graph facts are available from the knowledge graph 100. A knowledge graph fact in the example is defined by a triple (X, Y, Z) wherein X indicates a subject entity, Y indicates a relation, Z indicates an object entity.

(102, 120, 104)
(110, 122, 104)
(106, 124, 102)
(106, 128, 108)
(110, 126, 106)
(110, 130, 108)
(112, 132, 114)

In the example, the entity 102 is "hpi", the entity 104 is "germany", the entity 106 is "bob", the entity 108 is "person", the entity 110 is "john", the entity 112 is "bosch", the entity "114" is company. In the example, the relation 120 is "locatedIn", the relation 122 is "livesIn", the relation 124 is "worksAt", the relation 126 is "friendOf", the relation 128 is "type", the relation 130 is "type" the relation 132 is "type" and the relation 134 is "locatedIn". Other entities and other relations may exist.

In this example, the relation 134 is a spurious predicted fact. In this example the relations 120, 122, 124, 126, 128, 130 and 132 are true facts.

The KG is enhanced with an ontology. The ontology encompasses a representation, formal naming and definition of the individuals, classes and properties that substantiate a respective domain of discourse. The ontology comprises a formal explicit description of classes and/or properties and axioms about said classes and/or properties.

The ontology may be provided to detect or avoid inconsistencies in KGs. Inconsistency means that there exists a contradiction for example between one or more facts in the first data set and one or more axioms in the ontology.

The KG in FIG. 1 is for example enhanced with an ontology O that comprises:

(1) ∃worksAt⊑ person (2) ∃locatedIn$^-$⊑ location (3) personΠlocation⊑ ⊥

In the context of the disclosure, as set of types is referred to as set of class names $N_C$, a set of relations is referred to as a set of property names $N_p$, a set of entities is referred to as set of individuals $N_I$.

The set of property names $N_p$ comprises a relation rdf: type, that is referred to as type.

The KG G is a set of triples in the form ⟨s,o,p⟩ where $s \in N_I$, $p \in N_p$, $o \in N_I$ if $p \neq$type and $o \in N_C$ otherwise.

The KG follows an open world assumption, meaning it may only store a fraction of positive facts. For instance, given the KG of FIG. 1, ⟨john, type, person⟩ and ⟨john, livesIn, germany⟩ are true KG facts. However, whether ⟨john, worksAt, bosch⟩ is unknown.

Given a triple α, Ent(α) denotes a set of all entities occurring in α. For a set of triples, this is extended as $Ent(G)=\cup_{\alpha \in G} Ent(\alpha)$.

The ontology O in the example is as set of axioms expressed in a Description Logic according to DL-Lite$^{S\pi}$, i.e. an extension of DL-Lite. Another Description Logic may be used as well. Aspects of a Description Logic can be found in Baader, F., Horrocks, I., Sattler, U., "Description logics," in: Hb. on Ontol., pp. 21-43 (2009).

Classes C denoting sets of entities, and roles R denoting binary relations between entities, obey the following syntax:

$$C::=A|\exists R|A\pi B|A\sqcap B|\neg C$$

$$R::=P|P^-$$

Here, A, $B \in N_C$ are atomic classes and $P \in N_P$ is an atomic property, i.e. a binary relation. The ontology O is a finite set of axioms of the form $C_1 \sqsubseteq \subseteq C_2$, $R_1 \sqsubseteq \subseteq R_2$, $R^o R \sqsubseteq \subseteq R$, reflecting the transitivity of the relation R. The summary of the syntax in DL-Lite$^{S\pi}$ and its translation to OWL 21 is presented below. OWL 21 is available for example at https://www.w3.org/TR/ow12-overview/.

| DL Syntax | OWL Syntax | Semantics |
|---|---|---|
| R | R | $R^I \subseteq \Delta^I \times \Delta^I$ |
| $R^-$ | ObjectInverseOf(R) | $\{(e, d \mid d, e) \in R^I\}$ |
| A | A | $A^I \subseteq \Delta^I$ |
| ⊤ | owl: thing | $\Delta^I$ |
| ⊥ | owl: NoThing | Ø |
| ¬C | ObjectComplementOf(C) | $\Delta^I \backslash C^I$ |
| C ⊓ D | ObjectIntersectionOf(C, D) | $C^I \cap D^I$ |
| C ⊔ D | ObjectUnionOf(C, D) | $C^I \cup D^I$ |
| ∃P | ObjectSomeValues From (P, owl: Thing) | $\{d \mid \exists e \in \Delta^I: \langle d, e \rangle \in P^I\}$ |
| C ⊑ D | SubClassOf(C, D) | $C^I \subseteq D^I$ |
| P ⊑ S | SubObjectPropertyOf(P, S) | $P^I \subseteq S^I$ |
| P ∘ P ⊑ P | TransitiveObjectProperty(P) | $P^I \circ P^I \subseteq P^I$ |
| ⟨a, type, c⟩ | ClassAssertion(C, a) | $a^I \in C^I$ |
| ⟨a, p, b⟩ | ObjectPropertyAssertion(P, a, b) | $\langle a^I, b^I \rangle \in P^I$ |

In the above, A; R are a class name and property name respectively; C and D are class expressions, P; S are property expressions, and a; b are entities.

The exemplary KG depicted in FIG. 1 enhanced with the ontology O reflects a domain knowledge about people and their working places. The ontology states that (1) the domain of worksAt relation is person, (2) the range of locatedIn is location, and (3) person is disjoint with location.

The semantics of knowledge graphs and ontologies may be used to detect inconsistencies in the KG and provide explanations of these. The semantics of the KG and the ontology is defined using the direct model-theoretic semantics via an interpretation $I=(\Delta^{I,\cdot I})$ comprising a non-empty set $\Delta^I$, the domain of I, and an interpretation function that assigns to each $A \in N_C$ a subset $A^I \subseteq \Delta^I$, to each $R \in N_R$ a binary relation $R^I \subseteq \Delta^I \times \Delta^I$, and to each $\alpha \in N_I$ an element $\alpha^I \in \Delta^I$.

For in particular complex classes and roles, an interpretation I satisfies an axiom α if a corresponding condition holds, i.e. $I \vDash \alpha$.

For the KG G and the ontology O, I is a model of G∪O, i.e. $I \vDash G \cup O$ if $I \vDash \alpha$ for all axioms $\alpha \in G \cup O$. G∪O entails an axiom α, i.e. $G \cup O \vDash \alpha$, if every model of G∪O satisfies α.

The KG G is inconsistend with regard to the ontology O if no model for G∪O exists. G∪O is inconsistent for example, when some facts of G contradict some axioms of O.

Under the considered ontology language, the KG inconsistency has a locality property, i.e., the problem of checking inconsistency for the KG with regard to the ontology O is reducible to checking inconsistency for separated KG modules with regard to O.

Given the KG G and an entity $e \in Ent(G)$ the module of e with regard to G may be defined as $M(e; G)=\{\alpha \mid \alpha \in G$ and e occurs in $\alpha\}$. A set of modules for individuals occurring in G is denoted as $M_G=\{M(e,G) \mid e \in Ent(G)\}$.

G∪O is consistent if M(a,G)∪O is consistent for every $a \in Ent(G)$.

An explanation for inconsistency of G∪O is denoted by $\varepsilon=\varepsilon_G \cup \varepsilon_O$ with $\varepsilon_G \subseteq G$ and $\varepsilon_O \subseteq O$. The explanation ε is in the example a smallest inconsistent subset of G∪O.

For example, the facts in FIG. 1 including the fact that has the relation 134 are inconsistent with the ontology O. A possible explanation for this is $\varepsilon=\varepsilon_G \cup \varepsilon_O$ with $\varepsilon_G=\{$⟨bosch, locatedIn,john⟩, ⟨john, type, person⟩$\}$ and $\varepsilon_O=\{\exists locatedIn^- \sqsubseteq$ location, person$\pi$ location$\sqsubseteq \bot\}$.

The KGE in the example represents the entities and relations in a continuous vector space as embedding, i.e. vectors or matrices. The embedding are in the example used to estimate the likelihood of a triple to be true via a scoring function: $f: N_I \times N_P \times N_I$.

Concrete scoring functions are defined based on various vector space assumptions. The likelihood that the respective assumptions of the embedding methods hold, should be higher for triples in the KG than for negative samples outside the KG. The learning process may be done through minimizing the error induced from the assumptions given by their respective loss functions.

TransE, according to Bordes, A., Usunier, N., Garcia-Duran, A., Weston, J., Yakhnenko, O., "Translating embedding for modeling multi-relational data," in: NeurIPS. pp. 2787-2795 (2013) embeds entities and relations as vectors and assumes $v_S+v_P \approx v_O$ for true triples, where $v_S$, $v_P$, $v_O$ are vector embedding for subject s, predicate p and object o, respectively. TransE uses, to optimize the KGE, a loss function $$\sum_{\langle s_i,p_i,o_i\rangle \in S^+} \sum_{\langle s_i',p_i,o_i'\rangle \in S^-} [\gamma - f(s_i, p_i, o_i) + f(s_i', p_i, o_i')]_+$$

where $f(s,p,o)=-\|v_S+v_P-v_O\|_1$ and $S^+$ and $S^-$ correspond to sets of positive and negative training triples respectively. $S^+$ and $S^-$ are in the example disjoint.

ComplEx, according to Trouillon, T., Welbl, J., Riedel, S., Gaussier, É., Bouchard, G., "Complex embedding for simple link prediction," in: ICML. pp. 2071-2080 (2016) embeds entities as vectors and relations as matrices and assumes for true triples, a linear mapping $M_P$ Of a subject embedding vs is close to an object embedding $v_O$: $v_S M_P \approx v_O$. ComplEx uses, to optimize the KGE, a loss function $$\sum_{\langle s_i,p_i,o_i\rangle \in S^+} \sum_{\langle s_i',p_i,o_i'\rangle \in S^-} l(1, f(s_i, p_i, o_i)) + l(-1, f(s_i', p_i, o_i'))$$

where $f(s,p,o)=v_S M_P v_O$ and $l(\alpha,\beta)=\log(1-\exp(-\alpha\beta))$

The KGE may be trained with either of these loss functions or with another loss function as well.

A device 200 for determining a negative sample for training the KGE is depicted schematically in FIG. 2. The device 200 comprises at least one storage and at least one processor.

In the example, a storage 202 is configured to store a KG, a KGE, an ontology, positive samples, and negative samples.

In the example a processor 204 is configured to execute a method for determining a negative sample for training the KGE. The method is described with reference to FIG. 3 below. The storage 202 may store computer readable instructions that, when executed by the processor 204, cause it to execute the method.

The input to the method is a KG 302 and an ontology 304. The KG 302 may be G the ontology 304 may be O. An output of the method is a set of negative samples 306-1. The method comprises providing positive samples 306-2 from the KG 302 as well. The negative samples 306-1 and the positive samples 306-2 are incorporated during an iterative training and tuning of the KGE 308 in at least one iteration.

The KGE 308 may be defined according any embedding method, e.g. TransE or ComplEx. The method aims at generating an enhanced KGE 308, which is trained for predicting triples that are consistent with the KG 302 and the ontology 304.

A negative sample 306-1 is obtained based on at least one predicted triple 310, and based on at least one set of triples 312 that represent an explanation for its inconsistency with respect to the KG 302 and the ontology 304.

The method starts, in a first training iteration, with a step 1. In the step 1, a model of the KGE 308 is initialized.

In step 1, negative samples 306-1 are determined from the KG 302 with a negative sampling method, e.g., according Bordes, A., Usunier, N., Garcia-Duran, A., Weston, J., Yakhnenko, O., "Translating embedding for modeling multi-relational data," in: NeurIPS. pp. 2787-2795 (2013).

Afterwards a step 2 is executed.

In step 2, the method comprises performing embedding training with the negative samples 306-1 and positive samples 306-2 to construct the model for the KGE 308.

This model of the KGE 308 is used for obtaining predictions and computing the set of negative samples for a next training iteration.

Afterwards a step 3 is executed.

Step 3 comprises determining with the KGE 308 at least one predicted triple 310.

The at least one triple 310 comprises a subject entity and an object entity from the knowledge graph 302 and a relation that is defined for the knowledge graph 302.

Predicting the at least one triple 310 may comprise an object prediction and/or a subject prediction. The method may comprise such predictions per triple in training data or for selected triple in the training data. The training data comprises the negative samples 306-1 and the positive samples 306-2.

In object prediction, an object o is determined for a triple in the training set with the subject s and predicate p of this triple. Preferably, a plurality of candidate objects are predicted and ranked according to their respective likelihood of being an object that results in a consistent triple and a top ranked object o is selected from the plurality of objects.

With these, a predicted triple $\langle s,p,o \rangle$ is retrieved as the respective prediction of the model of the KGE 308.

In subject prediction, a subject s is determined for a triple in the training set with the object o and predicate p of this triple. Preferably, a plurality of candidate subjects are predicted and ranked according to their respective likelihood of being a subject that results in a consistent triple and a top ranked subject s is selected from the plurality of subjects.

With these, a predicted triple $\langle s,p,o \rangle$ is retrieved as the respective prediction of the model of the KGE 308.

In the example, triples that are not in the training set are considered as predictions. In the example, triples that are in the training set are no predictions.

Afterwards a step 4 is executed.

Step 4 comprises determining the set of triples 312 to comprise at least one triple of the knowledge graph 302 and the at least one predicted triple 310 that is inconsistent with respect to the ontology 304.

The step 4 may comprise determining a set of explanations for inconsistency, and selecting the explanation from the set. A number of K explanations may be selected.

Afterwards a step 5 is executed.

Step 5 comprises for the object prediction determining from the set of triples a replacement entity for the object entity in the at least one predicted triple 310, and determining the negative sample 306-1 to comprise the relation, the subject entity and the replacement entity.

Determining the replacement entity for the object entity may comprise determining a local type of the object entity in the set of triples 312 and selecting the replacement entity that has a local type within a predetermined order from the local type of the object entity.

Preferably, the replacement entity for the object entity is determined such that a triple resulting from replacing the object entity with the replacement entity is different than the at least one predicted triple and than the triples of the knowledge graph 302.

Step 5 comprises for the subject prediction determining 5 from the set of triples 312 a replacement entity for the subject entity in the at least one triple of the predicted triples 310, and determining the negative sample 306-1 to comprise the relation, the object entity, and the replacement entity.

Determining the replacement entity for the subject entity may comprise determining a local type of the subject entity in the set of triples 312 and selecting the replacement entity that has a local type within a predetermined order from the local type of the subject entity.

A local type of an entities is defined as a tuple comprising other entities via the type-relation, and also incoming and outgoing relations to/from that entity. The local types of entities can be ordered based on some criteria, e.g. subset-relation.

Preferably, the replacement entity for the subject entity is determined such that a triple resulting from replacing the subject entity with the replacement entity is different than the at least one predicted triple and than the triples of in the knowledge graph.

This means that the at least one predicted triple 310 is generalized to a generalized triple for other semantically similar triples. With the generalized triple an extended set of negative samples 306-1 is obtained.

Afterwards, the computed negative sample 306-1 is fed back as input to a training. Preferably, negative samples for subject predictions and object predictions are fed back as input to the training.

Afterwards, the step 2 is executed.

The steps 4 and 5 are described for at least one predicted triple 310. When more than one predicted triple 310 is found to be inconsistent with respect to the KG 302 and the ontology 304, these triples may be processed alike.

Preferably, a set of inconsistent triples is predicted in the training. Therefore once an inconsistent prediction for a triple is identified, the step 5 may comprise detecting an inconsistency pattern from that prediction and generalize the inconsistency pattern to obtain entities of the KG 302 that may be used as replacement entities to form other similar incorrect triples. The similar incorrect triples are generalized triples with respect to the inconsistent triple that was actually detected.

This way, a sufficient number of negative samples 306-1 is computed for retraining the model of the KGE 308. The negative samples 306-1 give hints to the model of the KGE 308 about the wrong patterns that it learned. This avoids a prediction of similar incorrect triples in next iterations.

For example, when the object prediction predicts the inconsistent predicted triple $\langle s,p,\hat{o}\rangle$, the object $\hat{o}$ is replaced by another entity o of the input KG such that the other entity o has similar KG neighborhood as the object $\hat{o}$.

However, it might happen that only a subset of triples containing the object $\hat{o}$ is inconsistent with regard to the ontology. Therefore, it is sufficient to find such entity o that it has similar triples as in that subset. This increases the number of generalized triples.

To compute a subset of triples of the object $\hat{o}$ that is inconsistent with regard to the ontology, step 5 may comprise determining explanations for the inconsistency of $\text{Relv}(\langle s,p,\hat{o}\rangle,G)\cup O$.

For the exemplary KG G and ontology O as in FIG. 1, the predicted triple may be $\alpha=\langle \text{bosch,locatedIn,john}\rangle$. This means, the KGE model 310 predicted john as the object entity for the given subject bosch and relation locatedIn. The explanation for inconsistency of $\text{Relv}(\alpha,G,G)\cup O$ is $\varepsilon=\varepsilon_G\cup\varepsilon_0$ whicht holds that $\varepsilon_G=\{\langle \text{bosch,locatedIn,john}\rangle, \langle \text{john, type, person}\rangle\}$ and $\varepsilon_O=\{\exists\text{locatedIn}^-\sqsubseteq \text{location}, \text{person}\pi\ \text{location}\sqsubseteq\bot\}$. Note that there is no other entity in G that has similar triples as those for john. However, when restricted to the triples in the explanation for inconsistency of $\text{Relv}(\alpha,G,G)\cup O$, then bob has the same neighborhood triple $\langle \text{bob, type, person}\rangle$ as john. The predicted triple is ignored in this case. Therefore, the triple (bob, type, person) is another negative sample, which together with the KG is inconsistent with regard to the ontology O.

To formally obtain generalized triples, the notion of local type of an entity according to Glimm, B., Kazakov, Y., Liebig, T., Tran, T. K., Vialard, V., "ISWC," pp. 180-195 (2014); Glimm, B., Kazakov, Y., Tran, T., "Ontology materialization by abstraction refinement in horn SHOIF," in: AAAI. pp. 1114-1120 (2017); or Tran, T., Gad-Elrab, M. H., Stepanova, D., Kharlamov, E., Strötgen, J., "Fast computation of explanations for inconsistency in large-scale kgs," in: WWW 2020. pp. 2613-2619 (2020) may be used, e.g., as follows.

Local Types: Let T be a set of triples and e an entity occurring in T. Then, the local type of e with regard to T, written as $\tau(e; T)$ or $\tau(e)$ when T is clear from the context, is defined as a tuple $\tau(e)=\langle\tau_i(e), \tau_c(e), \tau_o(e)\rangle$ where $\tau_i(e)=\{p|\langle s,p,e\rangle\in G\}$, $\tau_c(e)=\{t|\langle e, \text{type}, t\rangle\in G\}$, and $\tau_o(e)=\{p'|\langle e, p', o\rangle\in G\}$. $t\preccurlyeq t'$ indicates that a local type $t=\langle t_i,t_c,t_o\rangle$ is smaller than or equal to a local type $t'=\langle t'_i, t'_c, t'_o\rangle$. $t\preccurlyeq t'$ holds, if $t_i\subseteq t'_i$, to $t_c\in t'_c$, and $t_o\subseteq t'_o$.

A local type of an entity represents a set of types $\tau_c$ as well as incoming relations $\tau_i$ and outgoing relations $\tau_o$ for that entity in a set of triples.

For the exemplary KG of FIG. 1, a local type of bob with regard to G is $\tau(\text{bob})=(\{\text{friendOF}\}, \{\text{person}\}, \{\text{worksAt}\})$. The local type of john with regard to the explanation $\varepsilon_G\backslash\alpha$ is $\tau(\text{john})=\langle\emptyset, \{\text{person}\}, \emptyset\rangle$ and it holds that $\tau(\text{john})\preccurlyeq\tau(\text{bob})$.

Generalized triples may be determined as Generalized Samples of a given inconsistent predicted triple.

Generalized Samples: In the following, the KG 302 is referred to as G and the ontology 304 is referred to as O and the triple 310 is referred to as $\alpha=\langle s,p,\hat{o}\rangle$ in which the predicted object $\hat{o}$ is predicted by the model of the KGE 308 given the subject entity s and relation p and the explanation of the inconsistency 312 is referred to as $\text{Relv}(\alpha, G)\cup O$. A set of generalized samples of $\alpha$ with regard to the predicted object $\hat{o}$, an explanation $\varepsilon$ and the KG G is defined as $\text{GeneralizedSamples}(\alpha, \hat{o})=\{\langle s,p,o\rangle|\tau(\hat{o}, \varepsilon_G\backslash\alpha)\preccurlyeq\tau(o,G)\}$. Likewise, $\text{GeneralizedSamples}(\beta,\hat{s})$ of $\beta=\langle\hat{s},p,o\rangle$ in which the predicted subject $\hat{s}$ is predicted by the model of the KGE 308, is defined as $(\beta,\hat{s})=\{\langle\hat{s},p,o\rangle|\tau(\hat{s}, \varepsilon_G\backslash\beta)\preccurlyeq\tau(s,G)\}$. When it is clear from the context, to which entity, i.e. subject entity or object entity, the generalized sample applies, the corresponding entity is not mentioned: e.g., $\text{GeneralizedSamples}(\alpha)$ as $\{\alpha\}\cup\{\text{bosch, LocatedIn, bob}\}$.

For the KG G, the ontology O and a triple $\alpha$ for that $\text{Relv}(\alpha, G)\cup O$ is inconsistent with the explanation $\varepsilon_G\cup\varepsilon_O$, the $\text{GeneralizedSamples}(\alpha)$ is the set of generalized triples of $\alpha$ with regard to $\varepsilon$,G and some entity occurring in $\alpha$, $\text{Relv}(\beta,G)\cup O$ is inconsistent for $\beta\in\text{GeneralizedSamples}(\alpha)$.

The generalized triples of an iteration may be used as negative samples 306-1 to retrain the KGE model 308 in a next iteration or in the next iterations.

The predicted triples may concern a state of a machine, a property of an object in a digital image or an answer to a question.

The aforementioned triples may indicate a state of a machine, a property of an object in a digital image or an answer to a question.

The knowledge graph may represent knowledge about a mapping of status messages of a machine to a machine state.

The method may comprise receiving a status message and outputting the machine state depending on the status message. The state may be determined by predicting with the knowledge graph embedding model if a triple comprising a subject entity representing the status and an object entity representing the machine state exists or not. The method may comprise outputting the machine state.

For digital image processing, the knowledge graph may be a description of objects recognized in an object recognition for the image. Entities in the knowledge graph may represent the objects and/or properties thereof. The method may comprise receiving objects and outputting the description depending on the objects.

In a street view, an object may be a car, a person, a house or other part of an infrastructure. In the street view, the knowledge graph triple may describe the object and/or a relation of the object to another object in particular in the digital image. The method may comprise receiving objects and outputting the description depending on the objects.

What is claimed is:

1. A computer-implemented method, executed by one or more processors configured with a knowledge-graph embedding model and an ontology-reasoning engine, for training a knowledge graph embedding of a knowledge graph with automatic construction of ontology-inconsistent negative samples using minimal-explanation inconsistency analysis and structural local-type similarity, the knowledge graph being associated with an ontology defining machine-interpretable constraints specifying allowable combinations of entity types and relations in the knowledge graph, the method comprising the following steps:

using the knowledge-graph embedding model executed by the one or more processors to automatically compute predicted triples, each predicted triple including a subject entity, a relation, and an object entity;

using the ontology-reasoning engine executed by the one or more processors to automatically detect an inconsistency between at least one predicted triple and at least one triple of the knowledge graph with respect to the ontology, wherein the detecting includes:

computing, by the ontology-reasoning engine, a minimal inconsistency explanation comprising a smallest-cardinality subset of ontology axioms and triples of the knowledge graph that is inconsistent when combined with the predicted triple; and generating, from the minimal inconsistency explanation, a local neighborhood module including incoming relations, outgoing relations, and type assertions of entities participating in the inconsistency;

determining, by the one or more processors, a local-type descriptor of an entity appearing in the inconsistent predicted triple based on the local neighborhood module, the local-type descriptor including:

(i) incoming relationship triples in which the entity appears as an object, (ii) type triples asserting class membership of the entity according to the ontology, and/or (iii) outgoing relationship triples in which the entity appears as a subject;

selecting, by the one or more processors and from entities of the knowledge graph, a replacement entity whose local-type descriptor has a predetermined similarity relationship to the local-type descriptor of the entity appearing in the inconsistent predicted triple; and generating, by the one or more processors, a new negative sample triple that is different from the triples of the knowledge graph and the predicted triples, the generation being performed by replacing the entity appearing in the inconsistent predicted triple with the replacement entity, the new negative sample triple being inconsistent with respect to the ontology as a direct consequence of the replacement entity having been selected based on the local-type descriptor derived from the inconsistent predicted triple, thereby preserving the inconsistency identified in the minimal inconsistency explanation;

incorporating the new negative sample triple in a training corpus; and subsequent to the incorporation, training the knowledge graph embedding model in a training iteration.

2. The method according to claim 1, wherein the replacement entity is determined by comparing a similarity measure between the local-type descriptor of the entity appearing in the inconsistent predicted triple and the local-type descriptors of candidate replacement entities, and selecting the replacement entity based on the similarity measure satisfying a predetermined threshold.

3. The method according to claim 1, further comprising:

selecting a plurality of replacement entities whose respective local-type descriptors satisfy the predetermined similarity relationship, and generating a corresponding plurality of ontology-inconsistent negative sample triples.

4. The method according to claim 1, wherein the training includes performing a subsequent training iteration using at least one ontology-inconsistent negative sample generated in a prior iteration of the training.

5. A device comprising a processing system that includes one or more processors configured with a knowledge-graph embedding model and an ontology-reasoning engine for training a knowledge graph embedding of a knowledge graph with automatic construction of ontology-inconsistent negative samples using minimal-explanation inconsistency analysis and structural local-type similarity, the knowledge graph being associated with an ontology defining machine-interpretable constraints specifying allowable combinations of entity types and relations in the knowledge graph, wherein the processing is configured to:

use the knowledge-graph embedding model executed by the one or more processors to automatically compute predicted triples, each predicted triple including a subject entity, a relation, and an object entity;

use the ontology-reasoning engine executed by the one or more processors to automatically detect an inconsistency between at least one predicted triple and at least one triple of the knowledge graph with respect to the ontology, wherein the detection includes:

computing, by the ontology-reasoning engine, a minimal inconsistency explanation comprising a smallest-cardinality subset of ontology axioms and triples of the knowledge graph that is inconsistent when combined with the predicted triple; and generating, from the minimal inconsistency explanation, a local neighborhood module including incoming relations, outgoing relations, and type assertions of entities participating in the inconsistency;

determine, by the one or more processors, a local-type descriptor of an entity appearing in the inconsistent predicted triple based on the local neighborhood module, the local-type descriptor including:

(i) incoming relationship triples in which the entity appears as an object, (ii) type triples asserting class membership of the entity according to the ontology, and/or (iii) outgoing relationship triples in which the entity appears as a subject;

select, by the one or more processors and from entities of the knowledge graph, a replacement entity whose local-type descriptor has a predetermined similarity relationship to the local-type descriptor of the entity appearing in the inconsistent predicted triple; and generate, by the one or more processors, a new negative sample triple that is different from the triples of the knowledge graph and the predicted triples, the generation being performed by replacing the entity appearing in the inconsistent predicted triple with the replacement entity, the new negative sample triple being inconsistent with respect to the ontology as a direct consequence of the replacement entity having been selected based on the local-type descriptor derived from the inconsistent predicted triple, thereby preserving the inconsistency identified in the minimal inconsistency explanation;

incorporate the new negative sample triple in a training corpus; and subsequent to the incorporation, train the knowledge graph embedding model in a training iteration.

6. A non-transitory computer-readable medium on which is stored a computer program that is executable by a processing system that includes one or more processors configured with a knowledge-graph embedding model and an ontology-reasoning engine, for training a knowledge graph embedding of a knowledge graph with automatic construction of ontology-inconsistent negative samples using minimal-explanation inconsistency analysis and structural local-type similarity, the knowledge graph being associated with an ontology defining machine-interpretable constraints specifying allowable combinations of entity types and relations in the knowledge graph, the instructions, when executed by the processing system, causing the processing system to perform the following steps:

using the knowledge-graph embedding model executed by the one or more processors to automatically compute predicted triples, each predicted triple including a subject entity, a relation, and an object entity;

using the ontology-reasoning engine executed by the one or more processors to automatically detect an inconsistency between at least one predicted triple and at least one triple of the knowledge graph with respect to the ontology, wherein the detecting includes:

computing, by the ontology-reasoning engine, a minimal inconsistency explanation comprising a smallest-cardinality subset of ontology axioms and triples of the knowledge graph that is inconsistent when combined with the predicted triple; and generating, from the minimal inconsistency explanation, a local neighborhood module including incoming relations, outgoing relations, and type assertions of entities participating in the inconsistency;

determining, by the one or more processors, a local-type descriptor of an entity appearing in the inconsistent predicted triple based on the local neighborhood module, the local-type descriptor including:

(i) incoming relationship triples in which the entity appears as an object, (ii) type triples asserting class membership of the entity according to the ontology, and/or (iii) outgoing relationship triples in which the entity appears as a subject;

selecting, by the one or more processors and from entities of the knowledge graph, a replacement entity whose local-type descriptor has a predetermined similarity relationship to the local-type descriptor of the entity appearing in the inconsistent predicted triple; and generating, by the one or more processors, a new negative sample triple that is different from the triples of the knowledge graph and the predicted triples, the generation being performed by replacing the entity appearing in the inconsistent predicted triple with the replacement entity, the new negative sample triple being inconsistent with respect to the ontology as a direct consequence of the replacement entity having been selected based on the local-type descriptor derived from the inconsistent predicted triple, thereby preserving the inconsistency identified in the minimal inconsistency explanation;

incorporating the new negative sample triple in a training corpus; and subsequent to the incorporation, training the knowledge graph embedding model in a training iteration.

* * * * *